Figure 1:
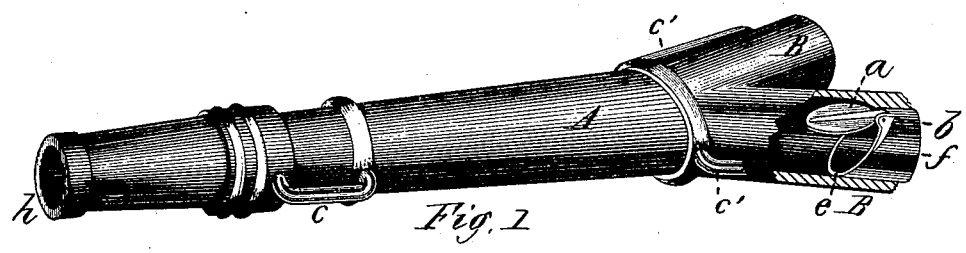

C. F. HOVEY & A. P. LESHURE.
HOSE-PIPE.

No. 181,940. Patented Sept. 5, 1876.

Witnesses.
C. E. Buckland
J. P. Wall

Inventors.
Charles F. Hovey
Abner P. Leshure
By J. A. Curtis
their atty

UNITED STATES PATENT OFFICE.

CHARLES F. HOVEY AND ABNER P. LESHURE, OF SPRINGFIELD, MASS.

IMPROVEMENT IN HOSE-PIPES.

Specification forming part of Letters Patent No. 181,940, dated September 5, 1876; application filed August 17, 1876.

*To all whom it may concern:*

Be it known that we, CHARLES F. HOVEY and ABNER P. LESHURE, of Springfield, in the State of Massachusetts, have invented a new and useful Improvement in Hose-Pipe; and we do hereby declare that the following is a full, clear, and exact description thereof, reference being had to the accompanying drawings, making a part of this specification, and to the letters of reference marked thereon, in which—

Figure 1 is a perspective view of a hose-pipe made according to our invention, and with one of its branches represented as partly in section, and showing the valve arranged therein.

Our invention relates to a hose-pipe having two or more branches, each of which is provided with an automatic valve, which is opened or closed by the action or force of the water, so that by attaching a line of hose to each branch from one or more engines all the streams may be concentrated into one at the nozzle, and a more powerful and effective stream thrown, while, if the line attached to either branch should become disconnected, or should burst, the valve of that branch will close itself at the instant of disconnection or bursting, and the stream thrown from the nozzle will still continue uninterrupted.

In the drawings, A represents the main part of the hose-pipe, which, in the drawing, is provided with two branches, B, each of which has an automatic valve therein, which, in this instance, consists of a cylindrical part, $f$, inserted into the branch B, and provided with a seat, $e$. A clapper, $a$, is hinged at $b$, in such manner that the clapper may swing freely upon its hinge or pivot, so as to fit well against its seat, the valve being closed from the inside to prevent the water from flowing back through the branch.

The operation of our invention is as follows: Two lines of hose having been connected to one or more engines, or to hydrants, one end of one line is attached to one of the branches B, and the end of the other line to the other branch B, and as the water is forced through both lines of hose into and through the branches, the valve $a$ in each branch is thrown open by the force of the water, into the position shown in the drawing, and the two streams are thus concentrated into one more powerful stream at the nozzle $h$, and is thrown upon a fire with far greater effect under the same water-pressure on the engines than the two streams would be thrown separately.

If one line of hose thus attached to the branches should burst, as is often the case when in use, and that, too, at the time the greatest effect is being produced upon the fire, the valve $a$ in the branch to which the disabled hose is attached is immediately automatically closed by the back pressure of the water in the hose-pipe in front of the valve, and passing in through the other branch; and the uninjured line may continue its operation without cessation while the injured length is being taken out and replaced by another, and, when repaired, that line may resume operations without disturbing the other line.

When the lines of hose are laid for a long distance in and around buildings, it would not always be easy for the hose-pipe men to know which line of hose had burst, because, at the instant either line bursts, the pressure would be removed sufficiently to stop the stream from flowing through the nozzle with any force; and if a valve were used in the branches, which required to be turned by hand, the pipe-men would require to know which line had burst, and one of them would have to follow back the lines to ascertain where the breakage was. Meanwhile, the pipe would be disabled and useless for any effect whatever upon the fire until the valve of the injured line was turned, which could not be done until the location of the breakage was ascertained. In the use of our device, however, no such necessity exists, because, at the instant of the bursting of the hose, the valve closes itself, and the stream from the nozzle continues on uninterrupted, the pressure not being removed from the stream flowing through the uninjured line of hose.

It will thus be seen that a constant stream of water may be thrown through the same nozzle upon a fire without any attention whatever on the part of the hose-pipe men to the opening or closing of the valve in either branch should either line of hose burst.

It is evident that any number of branches may be used, and it is also evident that any convenient form of self-closing valve may be used, without departing from the nature and intent of the invention, as the object to be attained by the invention is to enable a constant stream of water to be thrown upon the fire without any attention of the pipe-men to the opening or closing of valves in the bursting or disconnection of hose.

We are aware that stop-cocks have heretofore been used in branch pipes designed for use in fire-extinguishers; but we are not aware that any valve has ever been used which is automatic in its operation, being opened and closed entirely and only by the action of the water.

Having described our invention, what we claim as new is—

A hose-pipe, A, having two or more branches, B, each of which is provided with a valve which is closed automatically by the action of the water when in use, to prevent the backward flow of water through its branch when the hose attached to that branch bursts or becomes disconnected, substantially as described.

CHARLES F. HOVEY.
ABNER P. LESHURE.

Witnesses:
T. A. CURTIS,
C. EUGENE BUCKLAND.